United States Patent
Chen et al.

(10) Patent No.: US 11,706,253 B2
(45) Date of Patent: Jul. 18, 2023

(54) SEMI-AUTOMATIC RULE GENERATOR

(71) Applicant: Trend Micro Incorporated, Tokyo (JP)

(72) Inventors: Chih-Sheng Chen, Taipei (TW); Yi-Chan Hung, Taipei (TW); Shr-An Su, Taipei (TW)

(73) Assignee: Trend Micro Incorporated, Tokyo (JP)

(*) Notice: Subject to any disclaimer, the term of this patent is extended or adjusted under 35 U.S.C. 154(b) by 511 days.

(21) Appl. No.: 16/545,321

(22) Filed: Aug. 20, 2019

(65) Prior Publication Data

US 2020/0036752 A1 Jan. 30, 2020

Related U.S. Application Data

(63) Continuation of application No. 11/771,695, filed on Jun. 29, 2007, now abandoned.

(51) Int. Cl.
*H04L 29/06* (2006.01)
*H04L 9/40* (2022.01)
*G06F 40/279* (2020.01)

(52) U.S. Cl.
CPC ........ *H04L 63/1483* (2013.01); *G06F 40/279* (2020.01); *H04L 63/1416* (2013.01); *H04L 63/1425* (2013.01); *H04L 63/1433* (2013.01)

(58) Field of Classification Search
CPC ............... G06F 40/279; H04L 63/1483; H04L 63/1416; H04L 63/1433; H04L 63/1425; H04L 63/168; H04L 63/0236
USPC ......................................................... 726/24
See application file for complete search history.

(56) References Cited

U.S. PATENT DOCUMENTS

| | | | | |
|---|---|---|---|---|
| 7,849,507 B1* | 12/2010 | Bloch | ................... | H04L 63/168 726/22 |
| 2004/0163043 A1* | 8/2004 | Baudin | ................. | G06F 16/313 715/234 |
| 2008/0133540 A1* | 6/2008 | Hubbard | ............. | H04L 63/1483 |

OTHER PUBLICATIONS

Multiple Sequence Alignment Containing a Sequence of Regular Expressions, Arslan, Jan. 2005 (Year: 2005).*

* cited by examiner

*Primary Examiner* — Jahangir Kabir
(74) *Attorney, Agent, or Firm* — Beyer Law Group LLP

(57) ABSTRACT

A computer-implemented method for generating a first set of longest common sequences from a plurality of known malicious webpages, the first set of longest common sequences representing input data from which a human generates a set of regular expressions for detecting phishing webpages. There is included obtaining HTML source strings from the plurality of known malicious webpages and transforming the HTML source strings to reduce the number of at least one of stop words and repeated tags, thereby obtaining a set of transformed source strings. There is further included performing string alignment on the set of transformed source strings, thereby obtaining at least a scoring matrix. There is additionally included obtaining a second set of longest common sequences responsive to the performing the string alignment. There is further included filtering the second set of longest common sequences, thereby obtaining the first set of longest common sequences.

19 Claims, 6 Drawing Sheets

SEMI-AUTOMATIC RULE GENERATOR

CROSS-REFERENCE TO RELATED APPLICATION(S)

The present application is a continuation of U.S. patent application Ser. No. 11/771,695, filed Jun. 29, 2007 entitled "Semi-Automatic Rule Generator," the disclosure of which is hereby incorporated by reference.

BACKGROUND OF THE INVENTION

A phishing attack is a fraudulent technique employed by individuals to obtain sensitive information, such as use ids, passwords, credit card numbers, bank account numbers, social security numbers, etc., from a user. Phishers accomplish their phishing attacks by disguising themselves as trustworthy and valid, most commonly through electronic communication, such as e-mail or instant messages.

For example, a phisher's e-mail may include a Uniform Resource Locator (URL) hyperlink in addition to verbiage urging the user to access the website of for example, XYZ Bank, in order to verify account information. However, when the user clicks on the URL hyperlink, the user is taken instead to a malicious website controlled by the phisher. The malicious website, cleverly designed to resemble XYZ Bank's valid website then asks for sensitive information from the user. Once the phisher has acquired this sensitive information, he or she can make use of this sensitive information to perpetuate fraud on the user. Some of these fraudulent activities may include, for example, withdrawing funds out of financial accounts belong to the user. Therefore, detecting these malicious websites efficiently is critical for protecting individuals and organizations alike.

One technique for detecting these malicious websites involves measuring the similarities between a potentially malicious website and a valid website by utilizing regular expressions. If a website is intentionally designed to mimic another website that requires the input of sensitive information, that mimicking website may be a malicious website, and the detection of such websites is an important strategy in the fight against phishing fraud. Generally speaking, when a potentially malicious website is identified, the HTML source code is collected from both the malicious website and the website which the malicious website was trying to duplicate. Once the HTML source code is collected, a human expert may analyze and verify the HTML source codes. The human expert then generates regular expressions by searching and matching the text and tags of the malicious website and valid websites HTML source codes, based on certain patterns. The regular expressions generated are then utilized to aid in the detection of future malicious websites and phishing, attacks.

While the aforementioned technique succeeds in detecting many malicious sites, engineers continue to look for improvements, it is felt that because of the heavy human-based involvement with the generation of the regular expressions, much effort is needed to create and maintain the regular expressions that are used for detecting malicious websites. This is particularly true given the fact that the number of websites created and updated daily increases exponentially as more people and institutions employ the internet for their communication needs and to transact commerce. Furthermore, the number of phishing sites also increases exponentially, making it difficult to manually keep up with the creation and maintenance of fraud-detecting regular expressions.

It is important that the regular expressions be accurately created and properly retained since incorrect regular expressions or outdated regular expressions tend to increase the probability of false positives as well as the probability that a malicious website will evade detection. Embodiments of the invention disclosed herein address some of the improvements to the prior art techniques of creating, maintaining, and using regular expressions for detecting phishing attempts.

SUMMARY OF INVENTION

The invention relates, in an embodiment, to a computer-implemented method for generating a first set of longest common sequences from a plurality of known malicious webpages, the first set of longest common sequences representing input data from which a human generates a set of regular expressions for detecting phishing webpages. The method includes obtaining HTML source strings from the plurality of known malicious webpages and transforming the HTML source strings to reduce the number of at least one of stop words and repeated tags, thereby obtaining a set of transformed source strings. The method further includes performing string alignment on the set of transformed source strings, thereby obtaining at least a scoring matrix. There is additionally included obtaining a second set of longest common sequences responsive to the performing the string alignment. The method also includes filtering the second set of longest common sequences, thereby obtaining the first set of longest common sequences.

In another embodiment, the invention relates to an article of manufacture having thereon a computer readable medium configured for storing computer readable code for generating a first set of longest common sequences from a plurality of known malicious webpages, the first set of longest common sequences representing input data from which a human generates a set of regular expressions for detecting phishing webpages. There is included code for obtaining source strings from the plurality of known malicious webpages and code for transforming the source strings to reduce the number of at least one of stop words and repeated tags, thereby obtaining a set of transformed source strings. There is also included code for performing string alignment on the set of transformed source strings, thereby obtaining at least a scoring matrix and code for obtaining a second set of longest common sequences responsive to the performing the string alignment. There is additionally included code for filtering the second set of longest common sequences, thereby obtaining the first set of longest common sequences.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
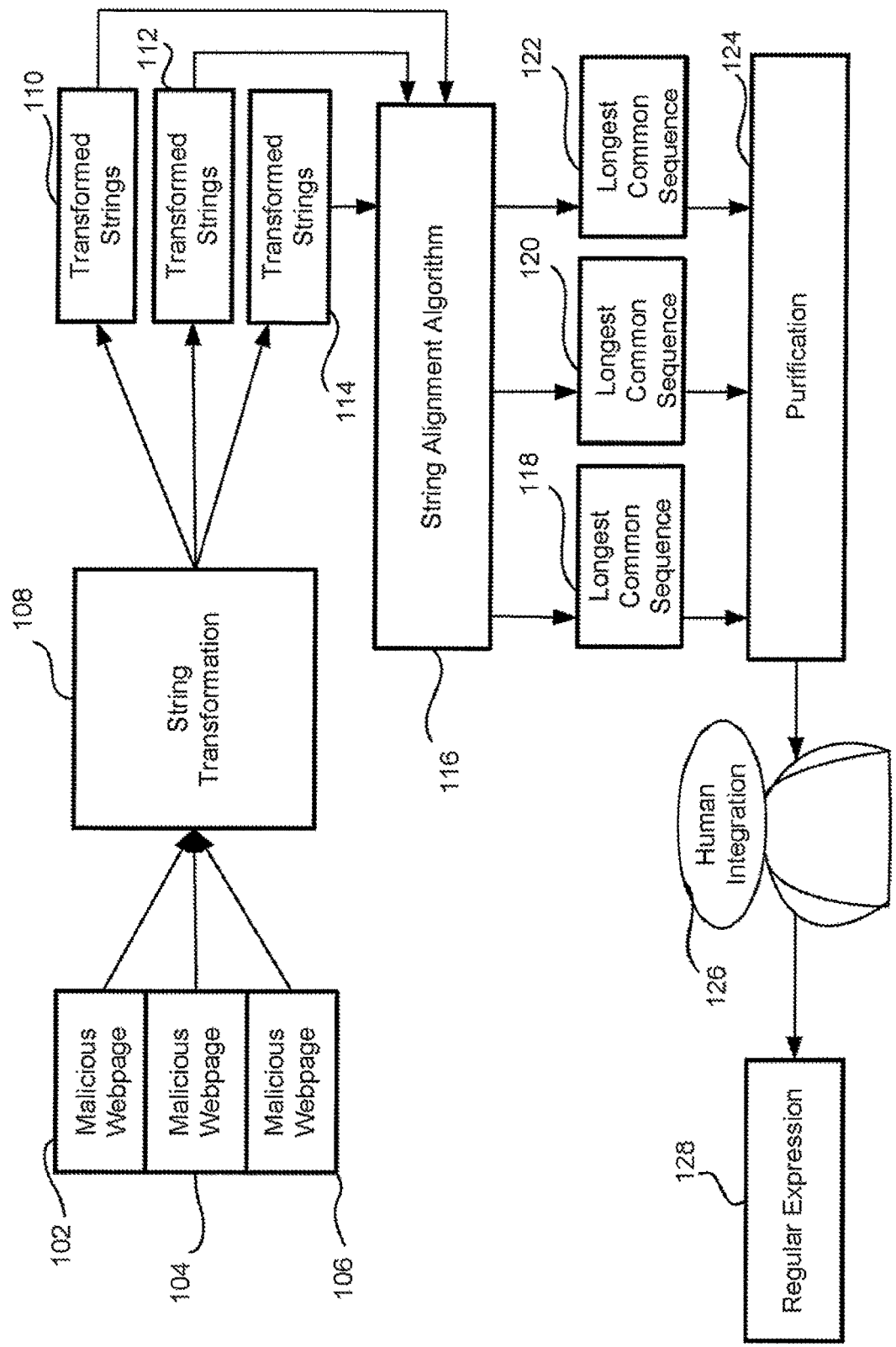
FIG. 1 shows, in accordance with an embodiment of the present invention, components of an arrangement for creating, maintaining, and utilizing regular expressions for detecting phi skiing attempts.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to apparatus and methods for implementing a semi-automatic rule generator to create, maintain, and use regular expressions for detecting phishing attacks. In one or more embodiments of the invention, string transformation is performed after HTML source code strings associated with malicious web pages are collected. During string transformation, visual key tags are preserved within the HTML source code strings while repeated tags and stop words are eliminated. By employing the process of string transformation on the HTML source code strings to eliminate redundant and/or clearly non-unique data, the calculations that follow may be performed more efficiently.

Furthermore, the semi-automatic rule generator is able handle different lengths of web page strings in order to increase the accuracy detecting malicious websites. For example, if web page string A is 500 characters in length and web page string B is 1000 characters in length, the semi-automatic rule generator may be able to handle both lengths of strings, instead of setting a length limitation, for example, of 250 characters. Therefore, by not setting a limit for web page string length, more regular expressions may be generated, thus, increasing the accuracy for detecting malicious web pages.

Once the string transformation has been completed, a string alignment algorithm may be applied. During the string alignment algorithm process, a scoring matrix may be created and dynamic programming calculations may be executed in order to generate the longest common sequences.

Once the longest common sequences have been generated, filtering is performed on the collection of longest common sequences. The longest common sequences are filtered to remove similarities in order to simplify the analysis needed by human experts. After the longest common sequences have been filtered, human integration may be performed. During human integration, analyses are performed in order to generate regular expressions. By simplifying the analysis needed in order to generate regular expressions by human experts, less effort is needed to create and maintain the regular expressions.

The features and advantages of the invention may be better understood with reference to the figures and discussions that follow. FIG. 1 shows, in accordance with an embodiment of the present invention, malicious web pages (10, 104, and 106), string transformation (108), string alignment algorithm (116), and human integration (126), representing components of an arrangement for creating, maintaining, and utilizing regular expressions for detecting phishing attempts.

The first step of the embodiment of FIG. 1 may include string transformation (108). During string transformation (108), the method may transform malicious web pages (102, 104, and 106) to HTML Source Code Strings associated with malicious web pages (102, 104, and 106). The HTML source code strings are then transformed by employing a filtering process. During the filtering process the visual key tags, for example, <title>, a herf>, <form>, <input types≠"hidden">, <img>, etc. are retained within the HTML source code strings. On the other hand, the redundant tags and the stop words may be eliminated from the HTML source code strings. Some examples of stop words may include commonly occurring verbs, articles, prepositions, conjunctions, and pronouns.

Furthermore, once string transformation (108) has been performed, string alignment algorithm (116) may then be applied. String alignment algorithm (116) employs a dynamic programming algorithm to calculate an optimal score and to generate the longest common sequence between two or more transformed strings (110, 112, and 114).

Once the longest common sequences have been generated, purification 124 may then be employed. During the process of purification 124, filtering is performed on the collection of longest common sequences. The longest common sequences are filtered to remove any similarities in order to simplify the analysis needed by human experts. After the longest common sequences have been filtered, human integration (126) may be performed. During human integration (126), analyses are performed in order to generate regular expressions (128).

As the mention previously, by employing a semi-automatic arrangement for creating, maintaining, and utilizing regular expressions for detecting phishing attempts, less human-based involvement may be required. With this decrease in human-based involvement, less effort is needed to created and maintain the regular expressions. This is particularly true due to the fact that the number of malicious websites is increasing exponentially, making it difficult to manually keep up with the creation and maintenance of fraud-detecting regular expressions. Furthermore, the semi-automatic arrangement may be able handle different lengths of web page strings in order to increase the accuracy detecting malicious websites.

Figure 2:
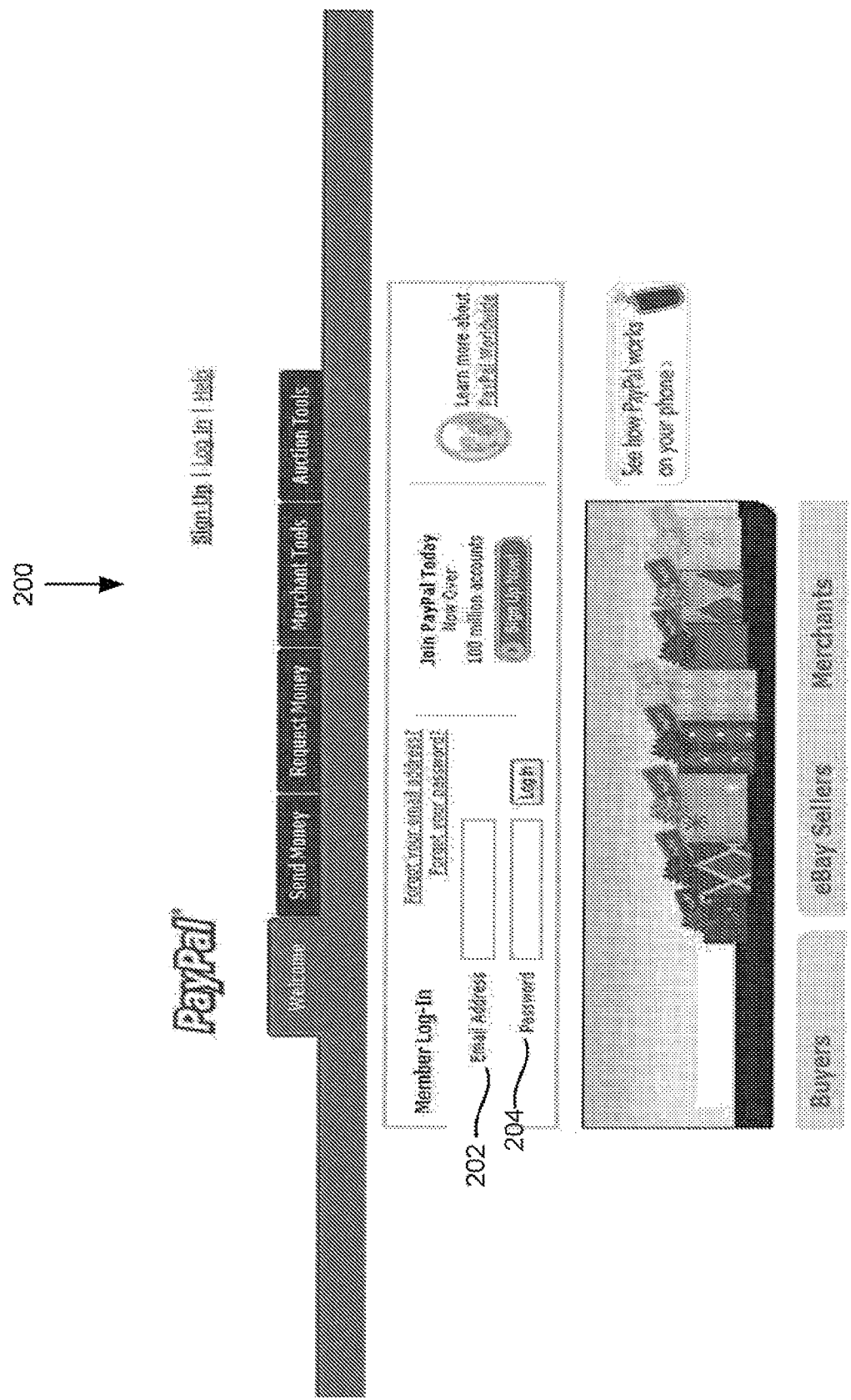
FIG. 2 shows, in accordance with an embodiment of the present invention, an example of a malicious web page employed by phishers attempting to acquire sensitive information from users.

FIG. 2 shows, in accordance with an embodiment of the present invention, an example of a malicious web page 200 employed by phishers attempting to acquire sensitive information from users. As mentioned earlier, phishers may send a fraudulent e-mail containing a Uniform Resource Locator (URL) hyperlink in addition to verbiage urging the user to access the website of, for example, Paypal™, in order to verify account information. However, when the user clicks on the URL, hyperlink, the user is then taken instead to the malicious website 200. The malicious website 200 asks for sensitive information from the user such as, e-mail address 202 and password 204. Once the phisher has acquired this sensitive information, he or she can make use of this sensitive information to perpetuate fraud on the user.

Appendix A shows, in accordance with an embodiment of the present invention, an example of a malicious web page's HTML source code string.

Figure 3A:
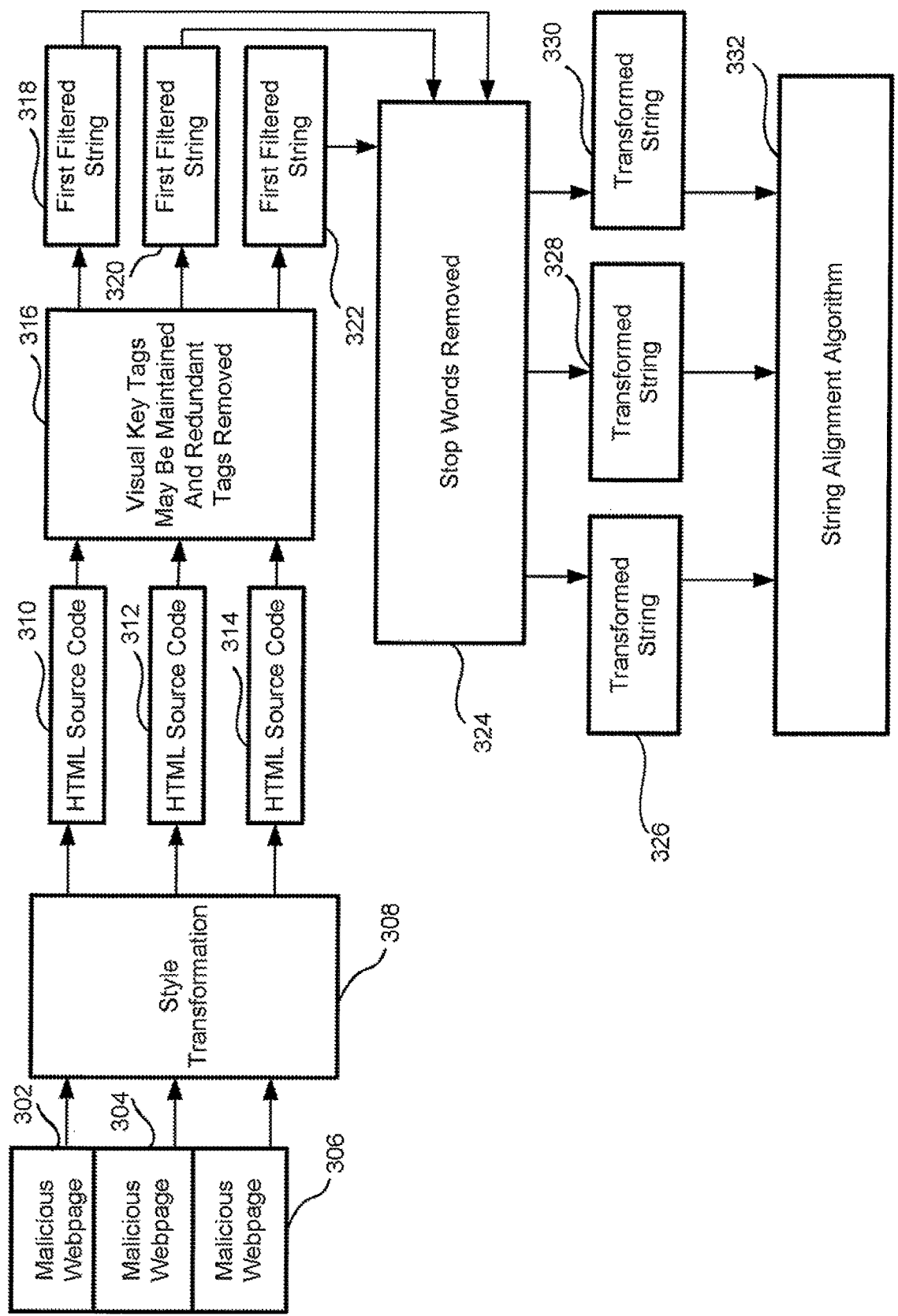
FIG. 3a shows, in accordance with an embodiment of the present invention, an example of the string transformation process.

FIG. 3a shows, in accordance with an embodiment of the present invention, an example of string transformation process including malicious web pages (302, 304, and 306), style transformation 308, filtering of redundant tags and maintaining of visual key tags 316, filtering of stop words 324, and string alignment algorithm 328.

The first step of the embodiment of FIG. 3a may include style transformation 308 of malicious web pages (302, 304, and 306) into HTML source code strings (310, 312, and 314). After the malicious web pages (302, 304, and 306) are transformed into HTML source code strings (310, 312, and 314), the visual key tags may be retained and the redundant tags may be removed (316) from the HTML source code strings (310, 312, and 314). Some examples of visual tags may include <title>, <a herf>, <form>, <input type≠"hidden">, <img>, etc.

After the HTML source code strings (310, 312, and 314) have been filtered for visual key tags and redundant tags, an additional filtering process may be employed. During the second filtering process, stop words may be removed (324) from first filtered strings (318, 320, and 322). Some examples of stop words may include commonly used verbs, articles, prepositions, conjunctions, and pronouns.

The transformed strings (326, 328, and 330) are then processed by string alignment algorithms 332. As mentioned earlier, string alignment algorithm 332 employs a dynamic programming algorithm to calculate an optimal score and to generate the longest common sequence between two strings.

Figure 3B:
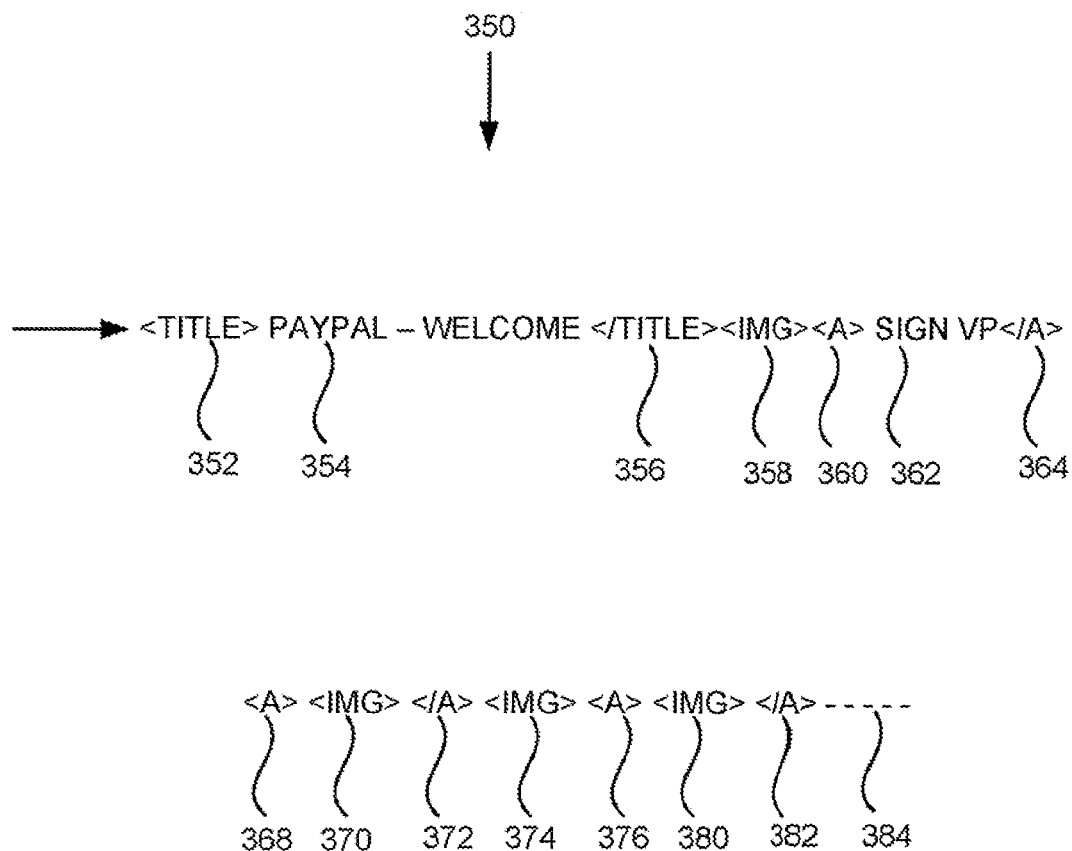
FIG. 3b shows, in accordance with an embodiment of the present invention, an example of a HTML Source Code String.

FIG. 3b shows, in accordance with an embodiment of the present invention, an example of a HTML Source Code String (350), where <Title> 352 represents a tag, Pay Pal—Welcome 354 represents a keyword combination etc.

Figure 4A:
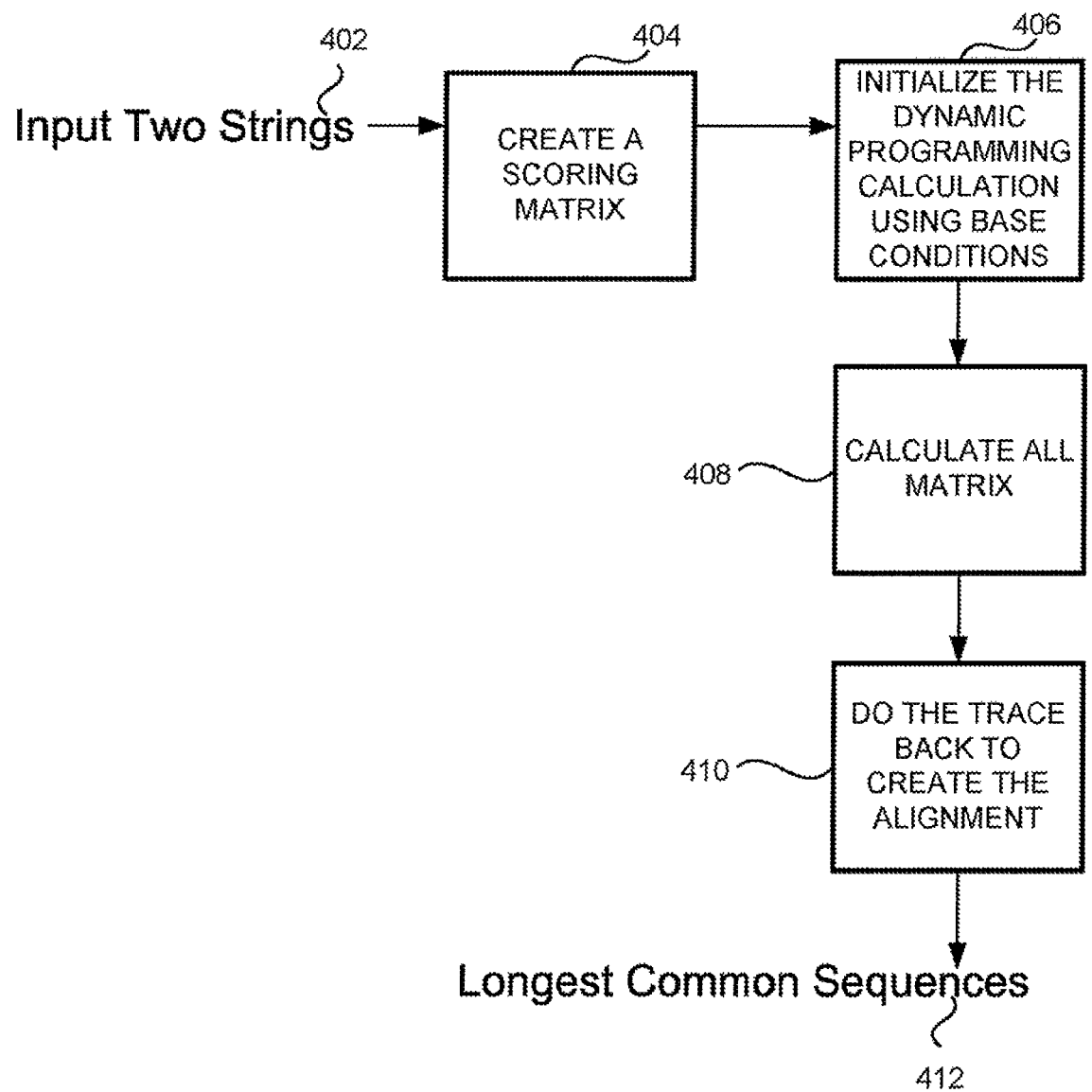
FIG. 4a shows, in accordance with an embodiment of the present invention, an example of siring alignment algorithm including input strings ad longest common sequences.

FIG. 4a shows, in accordance with aft embodiment of the present invention, example of string alignment algorithm including input strings 402 and longest common sequences 412. The string alignment algorithm represents a common technique which may be combined with the string transformation process 300 in order to determine the longest common sequences. Thus, the description provided below is illustrative of only one popular implementation of the string alignment algorithm. Further reading materials regarding the string alignment algorithm may be found from many reference sources, including for example a 2005 internet article entitled "String Alignment using Dynamic Programming" by Gina Cannarozzi (http://www.biorecipes.com/DynProgBasic/code.html), which is incorporated herein by reference.

The first step of the embodiment of FIG. 4a may include creating a scoring matrix 404. The scoring matrix 404 may be created by comparing two transformed strings 402 and analyzing the keywords or tags of the two transformed strings 402. For example, the number of times the keyword Pay Pal™ appears within the two transformed strings 402 may be counted and inputted into scoring matrix 404. Although only two transformed strings are discussed, the technique is capable of comparing any number of transformed strings to generate a scoring matrix.

After the scoring matrix 404 is created, a dynamic programming calculation may be initialized (406) in order to calculate the optimal score for the two transformed strings 402. During dynamic programming calculation 406, a score or weight may given to the analyzed key words or tags based on predefined or adjustable parameters. For example, a higher score or weight may be given to keyword combination A over keyword combination B.

Once the dynamic programming calculation has been performed to determine the optimal score, a second calculation (408) may be executed. The second calculation (408) may include a calculation algorithm employing both scoring matrix 404 and dynamic programming calculation 406.

After, the second calculation has been executed, traceback to create the alignment 410 may be performed. Traceback to create the alignment 410 may be performed in order to determine the longest common sequences 412. Again, the concept and implementation of the string alignment algorithm are well-known and will not be repeated here.

Figure 4B:
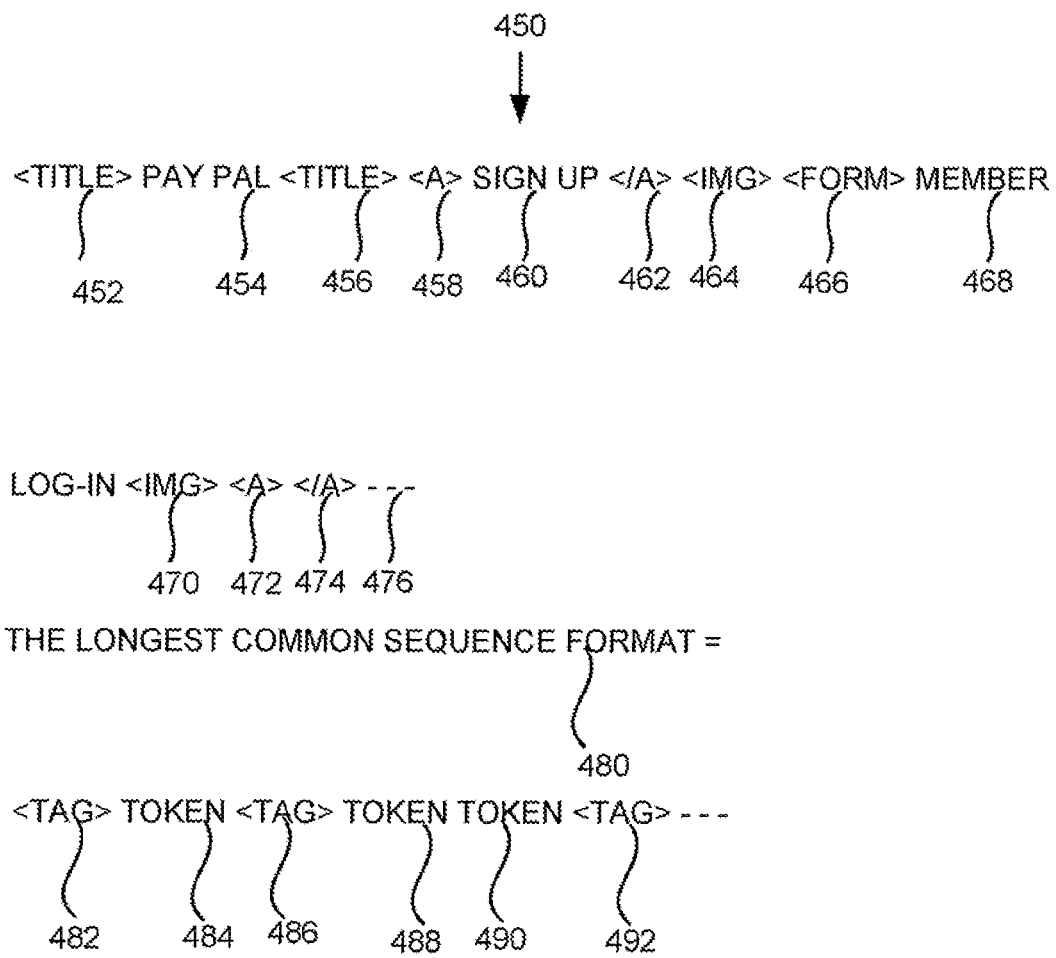
FIG. 4b shows, in accordance with an embodiment of the present invention, an example of a longest common sequence.

FIG. 4b shows, in accordance with an embodiment of the present invention, an example of a longest common sequence 450. For example, <title> 452 is a tag, Pay Pal™ 454 is a token, and <title> 456 is a tag etc. Therefore, the longest common sequence format 480 may follow the order of <TAG> 482, Token 484, <TAG> 486, Token 488, <TAG> 490, Token 492 etc.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A computer-implemented method for generating a first set of longest common sequences from a plurality of known malicious webpages, said first set of longest common sequences representing input data which is used to generate a set of regular expressions for detecting phishing webpages, comprising:

obtaining HTML source strings from said plurality of known malicious webpages;

transforming said HTML source strings to reduce the number of at least one of stop words and repeated tags, thereby obtaining a set of transformed source strings;

performing string alignment on said set of transformed source strings, thereby obtaining at least a scoring matrix;

obtaining a second set of longest common sequences responsive to said performing said string alignment;

filtering said second set of longest common sequences, thereby obtaining said first set of longest common sequences;

using said first set of longest common sequences to generate the set of regular expressions; and using the set of regular expressions to detect a phishing attack.

2. The method of claim 1 wherein said transforming said HTML source strings is configured to retain visual key tags of said HTML source strings.

3. The method of claim 1 wherein said filtering said second set of longest common sequences includes removing similarities among said second set of longest common sequences.

4. The method of claim 1 wherein said performing string alignment includes performing dynamic programming calculations of said at least one scoring matrix.

5. The method of claim 4 wherein said performing dynamic programming includes assigning different weights to different keyword combinations.

6. The method of claim 1 wherein said transforming said HTML source strings includes removing both stop words and said repeat tags.

7. The method of claim 1 wherein said transforming said HTML source strings includes removing said stop words, said stop worlds representing at least one commonly occurring verb, a commonly occurring article, a commonly occurring preposition, and a commonly occurring pronoun.

8. An article of manufacture having thereon a non-transitory computer readable medium for storing computer readable code for generating a first set of longest common sequences from a plurality of known malicious webpages, said first set of longest common sequences representing input data which is used to generate a set of regular expressions for detecting phishing webpages, comprising:

code for obtaining source strings from said plurality of known malicious webpages;

code for transforming said source strings to reduce the number of at least one of stop words and repeated tags, thereby obtaining a set of transformed source strings;

code for performing string alignment on said set of transformed source strings, thereby obtaining at least a scoring matrix;

code for obtaining a second set of longest common sequences responsive to said performing said string alignment;

code for filtering said second set of longest common sequences, thereby obtaining said first set of longest common sequences;

code for using said first set of longest common sequences to generate the set of regular expressions; and code for using the set of regular expressions to detect a phishing attack.

9. The article of manufacture of claim 8 wherein said source strings represent HTML source strings, and said transforming said HTML source strings is configured to retain visual key tags of said HTML source strings.

10. The article of manufacture of claim 8 wherein said filtering said second set of longest common sequences includes removing similarities among said second set of longest common sequences.

11. The article of manufacture of claim 8 wherein said performing string alignment includes performing dynamic programming calculations of said at least one scoring matrix.

12. The article of manufacture of claim 8 wherein said performing dynamic programming includes assigning different weights to different keyword combinations.

13. The article of manufacture of claim 8 wherein said transforming said HTML source strings includes removing both stop words and said repeat tags.

14. The article of manufacture of claim 8 wherein said transforming said HTML source strings includes removing said stop words, said stop worlds representing at least one commonly occurring verb, a commonly occurring article, a commonly occurring preposition, and a commonly occurring pronoun.

15. A computer-implemented method for generating a first set of longest common sequences from a plurality of known malicious webpages, said first set of longest common sequences representing input for generating a set of regular expressions for detecting phishing webpages, comprising:

obtaining HTML source strings from said plurality of known malicious webpages;

transforming said HTML source strings to reduce the number of at least one of stop words and repeated tags, thereby obtaining a set of transformed source strings;

performing string alignment on said set of transformed source strings, thereby obtaining at least a scoring matrix;

obtaining a second set of longest common sequences responsive to said performing said string alignment;

filtering said second set of longest common sequences, thereby obtaining said first set of longest common sequences; and using said first set of longest common sequences to generate the set of regular expressions for use in detecting a phishing attack.

16. The method of claim 15 wherein said performing string alignment includes performing dynamic programming calculations of said at least one scoring matrix.

17. The method of claim 16 wherein said performing dynamic programming includes assigning different weights to different keyword combinations.

18. The method of claim 15 wherein said transforming said HTML source strings includes removing both stop words and said repeat tags.

19. The method of claim 18 wherein said transforming said HTML source strings includes removing said stop words, said stop worlds representing at least one commonly occurring verb, a commonly occurring article, a commonly occurring preposition, and a commonly occurring pronoun.

* * * * *